Aug. 10, 1926.
J. R. RABIDOU
1,595,924
STONE SAW
Filed Dec. 8, 1924
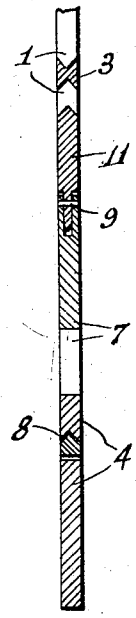
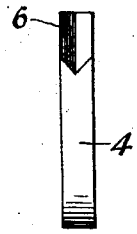
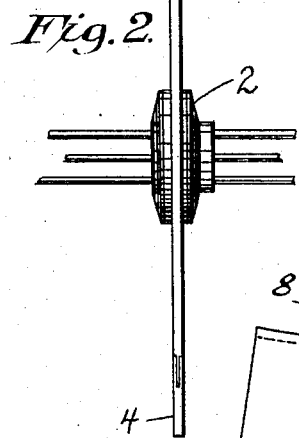
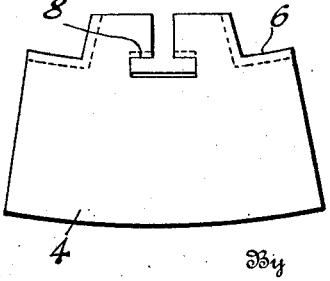
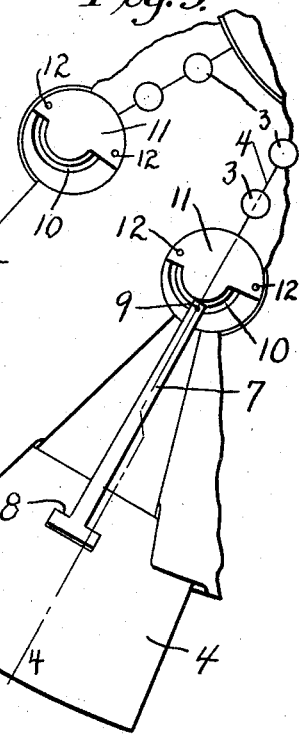
Inventor
J. R. Rabidou.
By
Attorney Patented Aug. 10, 1926.

1,595,924

UNITED STATES PATENT OFFICE.

JOSEPH RODRICK RABIDOU, OF NORTHFIELD, VERMONT.

STONE SAW.

Application filed December 8, 1924. Serial No. 754,588.

My invention relates to stone saws of the circular type which are adapted for use in stone sawing machines in which abrading material is forced against the stone by the saw so as to make a cut or kerf corresponding to that formed by a toothed saw in wood. The saw is preferably, of course, rotated by power and is constantly supplied with the abrading material. The stone to be cut may be fed to the saw or the saw may be moved into the stone as the cutting progresses.

In the use of stone sawing machines in which abrading material is forced against the stone, the cutting action depends to a considerable extent on the amount of abrading material which can be introduced between the edge of the saw and the stone at the end of the kerf.

It is a principal object of my invention to provide a circular saw having in its periphery relatively large openings adapted to receive considerable quantities of abrading material.

A further object is to provide a circular saw which will not be liable to the distortion which affects ordinary disk saws when subjected to working conditions.

With these objects and other objects hereinafter set forth in view, my invention consists in the construction and arrangement of elements hereinafter described and claimed.

Referring to the drawings:

Figure 1 is a side view of a preferred construction of saw;

Figure 2 is an edge view of the same saw;

Figure 3 is a detail view on an enlarged scale of a portion of the saw;

Figure 4 is a sectional view of the saw on line 4—4 of Figure 3;

Figure 5 is a detail of a disk used for retaining the saw teeth in position;

Figure 6 is a detail side view of one of the saw teeth;

Figure 7 is an edge view of the same.

In the drawings 1 indicates a series of radial arms secured at their inner ends in a hub 2 and having the edges of their adjoining portions fitting closely together and preferably keyed together by keys 3 and having their outer portions diverging so as to leave a substantial space between their outer ends. The outer ends of these radial arms 1 are provided with means for supporting removable cutting teeth 4. As indicated, the radial arms 1 may have their edges tapered to fit into grooves 6 in the cutting teeth 4, or the radial arms 1 may be provided with pockets adapted to receive therein the inner edges of the cutting teeth. The cutting teeth 4 are held in place by a small T-head clamp 7, the head portion of which is adapted to fit in and bear against a grooved slot 8 in the cutting tooth while the other end of the clamp 7 is provided with a pin 9 which fits in an eccentric slot 10 provided in a series of small disks 11 retained by the radial arms 1. As indicated, disk 11 is retained in a circular, grooved opening one-half of which is in one radial arm 1 and the other half in the adjacent radial arm. Disks 11 are thinner in the neighborhood of the eccentric slot 10 so that connection can be made with the clamp 7 without permitting anything to project from the face of the saw. Holes 12 in the disks 11 are provided so that a wrench can be used to turn them to pull the clamp 7 in tight. The hub 2 of the saw may be of any suitable construction providing the necessary strength.

It will be noticed that in all the saws shown and described, a disk saw having relatively large open spaces in its periphery is formed by the built up construction. It will also be noted that the construction of all elements used in making the saw is such that nothing projects from the faces of the finished saw disks.

Having thus described my invention what I claim is:—

A circular disk like stone saw comprising a hub, radial arms secured in the hub and separate one from the other toward their outer ends, means for fastening together adjacent edges of the radial arms for the inner portion of their length, removable cutting teeth secured at the outer ends of the radial arms by tongue and groove joints for supporting and rigidly holding the cutting teeth on the outer ends of the radial arms, and retaining means for the cutting teeth comprising clamps each having one end secured in a cutting tooth and the other end secured to a revolvable disk provided with an eccentric groove for drawing the arm inward.

In testimony whereof, I hereunto affix my signature.

JOSEPH RODRICK RABIDOU.